United States Patent [19]

Traut

[11] Patent Number: 4,656,069
[45] Date of Patent: Apr. 7, 1987

[54] STRUCTURES COMPRISED OF FIBER REINFORCED PLASTIC

[75] Inventor: G. Robert Traut, S. Killingly, Conn.
[73] Assignee: Rogers Corporation, Rogers, Conn.
[21] Appl. No.: 762,694
[22] Filed: Aug. 5, 1985

Related U.S. Application Data

[60] Division of Ser. No. 342,057, Jan. 25, 1982, Pat. No. 4,623,505, which is a continuation-in-part of Ser. No. 263,191, May 13, 1981, Pat. No. 4,615,859.

[51] Int. Cl.$^4$ .............................................. H01Q 1/40
[52] U.S. Cl. .................................... 428/35; 343/872
[58] Field of Search ................... 428/35, 297; 343/872

[56] References Cited

U.S. PATENT DOCUMENTS

| | | | |
|---|---|---|---|
| 3,235,636 | 2/1966 | Trimble | 264/127 |
| 3,336,873 | 8/1967 | Wilford | 264/56 |
| 4,451,833 | 5/1984 | Traut | 343/872 |

FOREIGN PATENT DOCUMENTS

| 0007656 | 1/1977 | Japan | 343/872 |
|---|---|---|---|

OTHER PUBLICATIONS

*Effects of Radome Discontinuities,* Ohio State Research, Oct. 1958.

Primary Examiner—John E. Kittle
Assistant Examiner—James J. Seidleck
Attorney, Agent, or Firm—Fishman & Dionne

[57] ABSTRACT

Unitary hollow structures, for example radomes, comprised of fiber reinforced plastic are produced with a large percentage of the fibers being randomly oriented in directions essentially parallel to the wall surfaces of the structures and with at least one surface having grooves to reduce microwave reflection. The structures are produced by packing a layer of fiber filled polymeric material in powder form around a mandrel which may have a pattern of grooves or ridges in its outer surface. The mandrel and packed powder are subjected to isostatic pressing to properly orient the fibers and achieve a density increase and powder cohesion. The pressed structure is sintered and the outer surface subsequently machined to a finished contour.

8 Claims, 13 Drawing Figures

STRUCTURES COMPRISED OF FIBER REINFORCED PLASTIC

CROSS-REFERENCE TO RELATED APPLICATION

This application is a division of application Ser. No. 342,057, filed Jan. 25, 1982, now U.S. Pat. No. 4,623,505, which is a continuation-in-part of U.S. patent application Ser. No. 263,191 filed May 13, 1981, now U.S. Pat. No. 4,615,859. The application is also a divisional of U.S. Pat. No. 4,623,505.

BACKGROUND OF THE INVENTION (1) Field of the Invention

The present invention is directed to the fabrication of unitary structures of complex shape, such as missile radomes, from fiber reinforced plastic material. More particularly, the present invention relates to hollow structures, such as radomes, which have improved longitudinal strength and, in the case of a radome, improved electromagnetic energy transmission characteristics.

(2) Description of the Prior Art

While not limited thereto in its utility, the present invention is particularly well suited for use in the manufacture of radomes. Accordingly, the discussion below will be primarily related to radomes.

Ceramic radomes are typically used for missiles intended to operate at speeds of Mach 4 or higher. These ceramic radomes have been found to be at best marginal in performance due to fragility, susceptability to thermal shock, high thermal conductivity and high rates of rain impact damage. A definite need for a workable alternative to ceramic radomes existed for many years.

Radomes made from polymeric materials have been suggested as a possible alternative to ceramic radomes Polytetrafluoroethylene, hereinafter PTFE, is one such polymeric material which might be suitable for radome applications. However, "neat" or simple filled PTFE does not possess the requisite characteristics, uniformity of erosion and ablation for example, for use in the demanding environment of a missile radome. Tests have shown that fiber reinforced PTFE, i.e., a PTFE composite with the fibers having a high aspect ratio, would have those characteristics dictated by radome and similar usage.

Prior to the invention disclosed in application Ser. No. 149,952, now U.S. Pat. No. 4,364,884, it had been a practical impossibility to fabricate a radome from a PTFE-fiber composite. The production of a solid block of PTFE composite of sufficient size to permit machining a radome therefrom is not feasible due to the virtual impossibility of heating such a large block through the crystalline melt point and subsequently cooling through the recrystallization point with enough uniformity of temperature to avoid fissures and damage from thermal stress. Furthermore, even if the temperature gradient and thermal stress problems could be avoided, an extremely long heating and cooling cycle (perhaps on the order of several weeks) would be required, and that long cycle time would result in thermal degradation. Other approaches, such as flowing a sheet of PTFE composite material to form a radome shape or laminating a series of rings or discs cut from such sheet material all involve substantial technical or cost problems which precluded the use of such material and techniques.

My U.S. Pat. No. 4,364,884 discloses a novel radome structure comprised of a fiber reinforced plastic material wherein the fibers are, to a high degree, randomly oriented in planes which are perpendicular to the axis of the radome. This novel fiber reinforced plastic radome is manufactured by sintering together preformed segments of the radome while maintaining axial pressure upon the segments. The preformed segments are formed by cold pressing a powdered PTFE-fiber composite material into rings or discs, the cold pressing step causing the fibers to become oriented randomly in planes perpendicular to the axes of the discs. These discs are machined to form a series of preforms of desired size and shape. The preforms are stacked within a mold cavity and subjected to heat and axial pressure. The resulting unitary sintered structure is machined to form the final desired product.

The final unitary product produced in accordance with the teachings of the above-mentioned U.S. patent overcomes many of the disadvantages of the prior art. It has excellent resistance to ablation and rain erosion and is not as fragile as previous ceramic radomes. Also, a fiber reinforced radome produced in accordance with the teachings of U.S. Pat. No. 4,364,884 is economical to produce when compared to the cost of machining a radome from a large block of PTFE-fiber composite.

However, a radome produced in accordance with the invention of U.S. Pat. No. 4,364,884 possesses. characteristics which limit its usage. For example, since the fibers are oriented in planes perpendicular to the radome axis, the longitudinal tensile strength of the structure is comparatively low. Accordingly, a supporting liner is needed in some cases. The liner will typically be comprised of a glass fiber-epoxy structure or a polyimide-glass fiber honeycomb structure. The bonding of a supporting liner within a previously formed radome may result in the radome fracturing or there may be incomplete bonding between the radome and the supporting liner. The problems associated with bonding a liner within a radome are due in part to the radome having a much higher degree of thermal expansion in the axial direction than does the supporting liner. When fracturing and/or incomplete bonding occurs it will happen during the processing step when heat is applied to cure the adhesive used to bond the liner to the radome. Either voids will form between the liner and the radome due to the radome expansion or the radome will fracture due to tension as it contracts on cooling if there is adequate bonding to the liner. It has also been observed that when exposed to low temperatures the bonded radome and liner assembly experiences axial stresses due to the differences in thermal expansion. These stresses result in tension between the radome and liner which can lead to fissure formation.

SUMMARY OF THE PRESENT INVENTION

The present invention overcomes the above-discussed disadvantages and other deficiencies of the prior art by providing a novel unitary structure of complex shape and comprised of a fiber reinforced composite material, such as a radome, and a method of manufacture thereof.

Thus, in accordance with the present invention a product comprised of fiber-reinforced polymeric material is produced wherein the fibers are to a high degree randomly oriented in planes which are perpendicular to lines which are normal to the inner surface of the radome. Longitudinal strength is greatly improved and lower thermal expansion co-efficient in the circumferential and longitudinal directions is obtained because of this fiber orientation. It is to be noted that resistance to ablation and rain erosion are not as great in the case of a radome produced in accordance with the present invention as in the case of the radome disclosed in U.S. Pat. No. 4,364,884. However, a radome in accordance with the present invention has sufficient resistance to rain erosion and ablation to be acceptable for many applications. The method of the present invention includes uniformly packing a thoroughly blended mixture of a polymeric material and reinforcing fibers in particulate form around a mandrel which is supported in a mold cavity. The mandrel has a surface contour which is commensurate with the desired contour of the interior of the structure to be produced. The layer of composite material formed about the mandrel is subjected to sufficient external pressure for a sufficient period of time to compact the powder to almost its ultimate desired density. In order to assure that a large percentage of the fibers become oriented in planes which are perpendicular to lines normal to the surface of the mandrel, the pressure should be applied equally over the entire exposed surface of the layer of composite material in a direction normal to the mandrel surface. The preferred method this pressure is a known isostatic pressing for applying this pressure is a known isostatic pressing technique. The mandrel and composite material are enclosed in a sealed flexible bag to prevent penetration of the pressing fluid into the composite material. It is further preferable to evacuate any air from within the bag and polymeric material powder in order to prevent fissures from developing in the formed layer when the pressure being applied is released.

After the composite material layer has been compacted by the applied pressure it is subjected to a sufficiently high temperature to fuse or sinter the polymeric material. In the case of PTFE, this temperature should range between 350° C. to 400° C. Furthermore, in order to reduce the possibility of cracking or fissure formation within the radome, or other structure, this heating is carried out in an inert atmosphere. If the powder layer is heated while still positioned around the mandrel it is essential to maintain the temperature differential across the layer of composite material between the mandrel and the surrounding atmosphere within a narrow range. This is especially crucial when the temperature is being raised through the crystalline melting temperature of PTFE and when it is being lowered through the recrystallization temperature of PTFE. If the temperature difference between the mandrel and surrounding atmosphere becomes too great, the radome may crack or fissure.

After the mandrel, if still present, and the cured PTFE layer are cooled to room temperature, the PTFE layer is finished by machining it to the desired dimensions of the product, for example a radome, being formed.

It has been determined that the reflection of microwave energy from a radome produced in accordance with the present invention may be reduced by providing either or both of the inner and outer surfaces of a radome comprised of a polymeric material-fiber composite with grooves. For a missile radome, if only one surface is to be grooved, it is aerodynamically better to provide the grooves on the inner surface. In accordance with a further aspect of the present invention, inner surface grooves are formed by compacting the composite material about a mandrel which is provided with a selected groove pattern. This pattern may comprise either a series of longitudinal grooves or one or more helical grooves. After the powder has been compacted and sintered about the mandrel the finished radome structure is removed. If the groove is of helical shape removal is effected by a twisting action. Grooves may be provided in the exterior surface after the radome is finished by suitable known machining procedures and, if provided, are preferably longitudinal.

BRIEF DESCRIPTION OF THE DRAWING

The present invention may be better understood and its numerous objects and advantages will become apparent to those skilled in the art by reference to the accompanying drawing wherein like reference numerals refer to like elements in the several Figures, and wherein.

DESCRIPTION OF THE PREFERRED EMBODIMENT

The present invention consists of a novel unitary structures comprised of fiber-reinforced plastic material and methods of manufacture thereof. It is to be noted that while a radome and the manufacture thereof will be discussed and illustrated, the invention is not limited to such use.

Figure 1A:
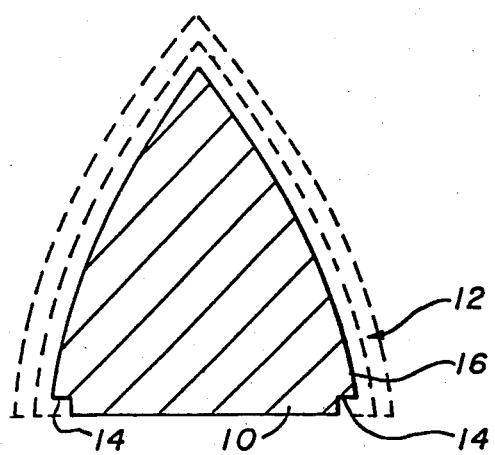
FIG. 1A and 1B depicts, in cross-sectional side elevation, two mandrels which may be employed in the novel manufacturing process of the present invention, polymeric composites being indicated schematically on the mandrels.
Figure 1B:
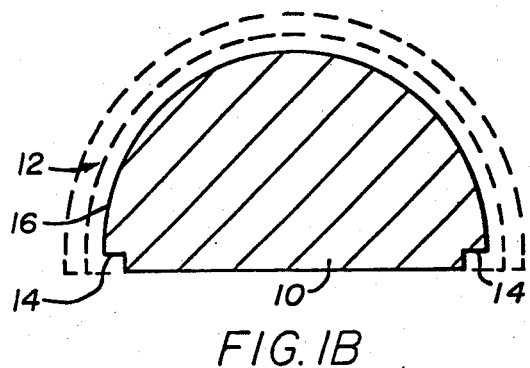
Figure 2:
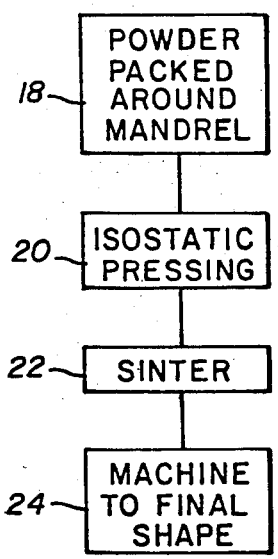
FIG. 2 is a flow diagram of the novel process of the present invention.

With reference now to the drawing, and particularly to FIGS. 1A, 1B and 2, the first step in the practice of the present invention involves packing a mixture comprising reinforcing fibers and a polymeric material, preferably polytetraflouroethylene (hereinafter PTFE), to form a layer 12 around mandrel 10. It is to be noted that the layer 12 has been shown as a double broken line to indicate that the fiber reinforced plastic is initially in the form of a powder which is subsequently compacted to reduce its thickness and increase its density. Mandrel 10 is preferably comprised of aluminum and has a surface contour 16 which corresponds to the desired contour of the interior surface of the radome. Mandrel 10 is prepared by any conventional machining technique and may be reused for processing numerous radomes of the desired shape. Preferably, mandrel 10 is provided with undercut 14. The function of undercut 14 will be discussed below.

Layer 12 is a thoroughly blended mixture of PTFE in powder form and reinforcing fiber. This blended mixture is prepared by a dry process which provides an intimate blending of the PTFE particles with the individual fibers. Also, the PTFE powder is sifted through a screen before blending to insure against lumps. Two examples of composite materials, i.e., thoroughly blended polymeric material-fiber mixtures, capable of use in the practice of the present invention are "RT/duroid" types 5650M and 5870M available from Rogers Corporation, Rogers, Conn. and comprising by weight:

| "RT/duroid" type | 5650 M | 5870 M |
|---|---|---|
| "Teflon" 7A (polytetrafluoroethylene, available from E. I. duPont) | 75% | 85% |
| Ceramic fibers (aluminum silicate fibers of random size and having an average diameter of about 1 µm and an average length exceeding 100 µm) | 25% | 0% |
| Glass Microfibers (available from the John-Manville Corp. and having an average diameter of about 0.2 µm and an length exceeding 30 µm) | 0 | 15% |

The final compounded powder, i.e., the PTFE-fiber mixture, has a preferred bulk density of about 0.25 grams/cubic centimeter.

The reinforcing fibers useful in the practice of the present invention may be comprised of a ceramic material, glass microfibers or other similar material. The fibers, which are inorganic, will typically range in diameter from 0.05 to 10 micrometers and will preferably have an aspect ratio of at least 30. The final fiber content of the mixture should range between 5% and 40% by weight.

While the above discussion has been limited to the use of only PTFE, other fluoropolymers may be added to the PTFE powder for the purpose of modifying the processing requirements or for obtaining certain desirable characteristics. Typically, such additives will possess lower melting temperatures, lower melt viscosity, better ability to wet fiber or filler surfaces, and better ability to close voids. Other types of PTFE resins which may be used are Teflon 7C or other commercially available granular or coagulated dispersion types of PTFE. Finally, melt processible fluoropolymers, such as Dupont's "Teflon FEP" or "Teflon PFA" may be added to serve as an aid to coalescence during the sintering step.

It is further possible to prepare the PTFE-fiber composite as an aqueous slurry. If the aqueous slurry process is employed a PTFE dispersion is added along with a flocculating agent to a mixture of water and fiber. This slurry is then dewatered, by vacuum, against a mesh fabric covered form, preferably a perforated shell shaped similarly to the mandrel 10. The resulting low density "pulp form" shape has, after drying, an inside diameter resembling the form. A PTFE dispersion useful in the practice of the present invention is "Fluorn" AD704, produced by ICI, America.

Figure 4A:
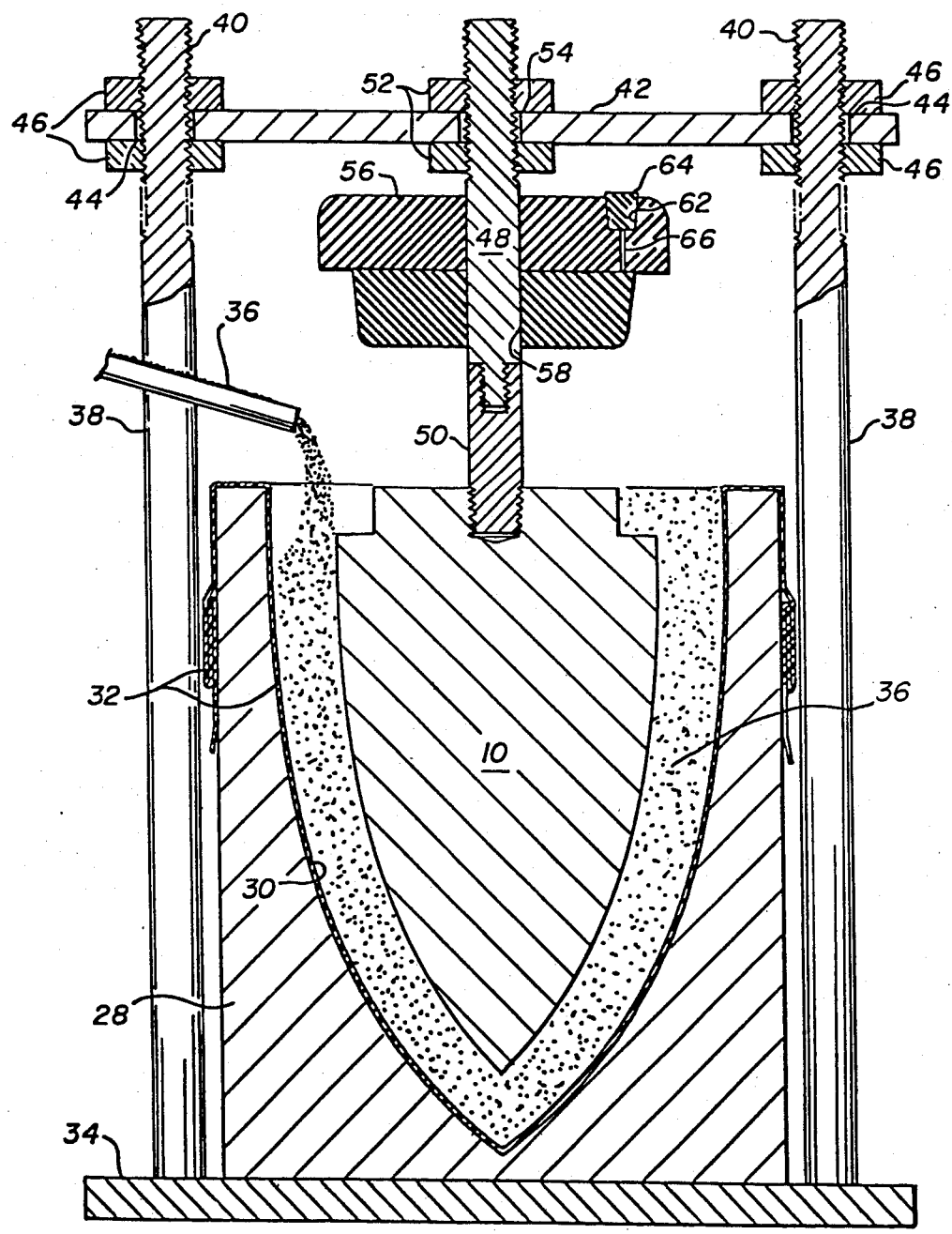
FIGS. 4A and 4B are cross-sectional views illustrating the step of forming a layer of composite material around a mandrel in practicing the method of FIG. 2.
Figure 4B:
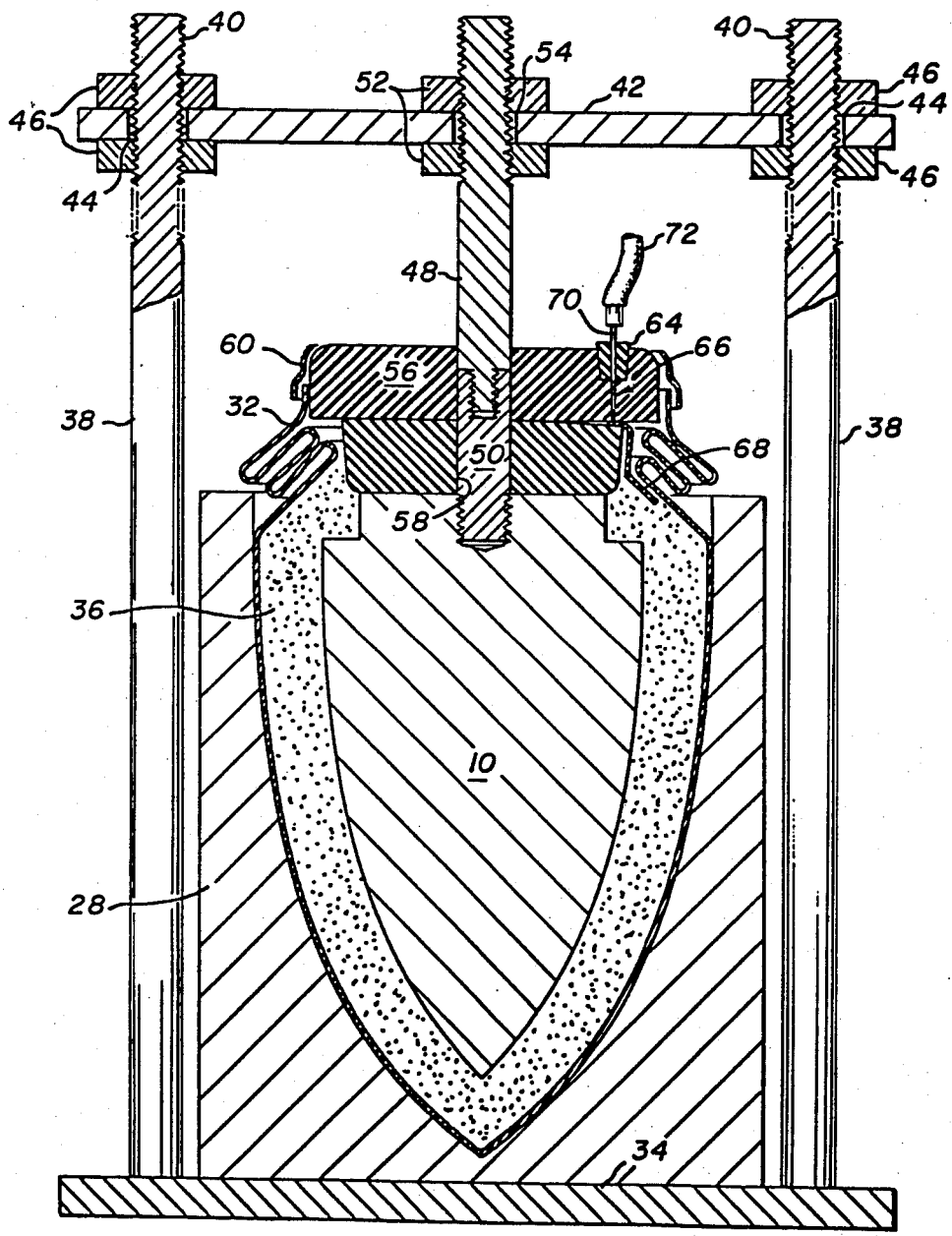

With reference to FIGS. 4A and 4B, a preferred method of forming the PTFE-fiber composite layer of the present invention about mandrel 10 is depicted. A mold 28 is provided with a cavity 30 that is larger than the exterior contour of the radome to be formed. The cavity configuration is designed to allow for the bulk factor of the mixture so as to insure that the layer 12, in its final configuration is sufficiently oversized to permit machining the outer contour by cutting away a minimal amount of trim. An elastic bag 32, having approximately the same shape as cavity 30, is positioned within cavity 30. The open end of bag 32 is stretched over the mold 28 and sealed against the exterior surface thereof. The space between the bag 32 and the cavity 30 is evacuated by a high volume pump (not shown) which is connected to cavity 30 through passages provided in mold 28 (also not shown). This conforms bag 32 to the surface of cavity 30.

Mold 28 is positioned upon a base plate 34. Three posts 38, only two of which are shown, extend upwardly from plate 34. Posts 38 are arranged triangularly and are provided with threaded ends 40. A Y-shaped support plate 42 is supported on posts 38 by passing threaded ends 40 of the posts through apertures 44 in plate 42. Plate 42 is secured at a desired height by nuts 46 as shown.

A mandrel support shaft comprising a pair of interconnected rods 48 and 50 extends from Y-shaped support plate 42. Rod 48 is provided with external threads at both ends while rod 50 is provided with only one externally threaded end. The second end of rod 50 has an internally threaded blind hole which engages a first end of rod 48. The other end of rod 48 passes through an aperture 54 in plate 42 and is held to plate 42 by a pair of nuts 52.

The externally threaded end of rod 50 engages mandrel 10. Mandrel 10 is lowered into cavity 30 of mold 28 until the desired spacing between the wall of cavity 30 and mandrel 10 is achieved. This spacing should be sufficient to allow the appropriate amount of PTFE composite powder 36 to be delivered into bag 32. An elastomeric plug 56, preferably in two sections, is positioned around the mandrel support shaft. Plug 56 is provided with a hole 58 which, while allowing passage of rods 48 and 50, provides a tight enough fit to seal a vacuum. Plug 56 is also provided with a cavity 62, which receives a self-sealing rubber stopper 64, and an evacuation port 66 which extends from the bottom of cavity 62.

The PTFE composite powder 36 is seived into the space between mandrel 10 and bag 32. Caution must be taken while loading the powder 36 to insure even distribution of the powder within bag 32 and light tamping and/or vibration may be employed. After bag 32 is fully filled, it is closed. This is accomplished by sliding elastomeric disc plug 56 down shafts 48 and 50 until it contacts mandrel 10. The bag 32 is then taped to the plug 56, preferably by plastic pressure-sensitive tape 60, as shown in FIG. 4B. This prevents liquid intrusion into bag 32 during isostatic pressing step 20.

Figure 5:
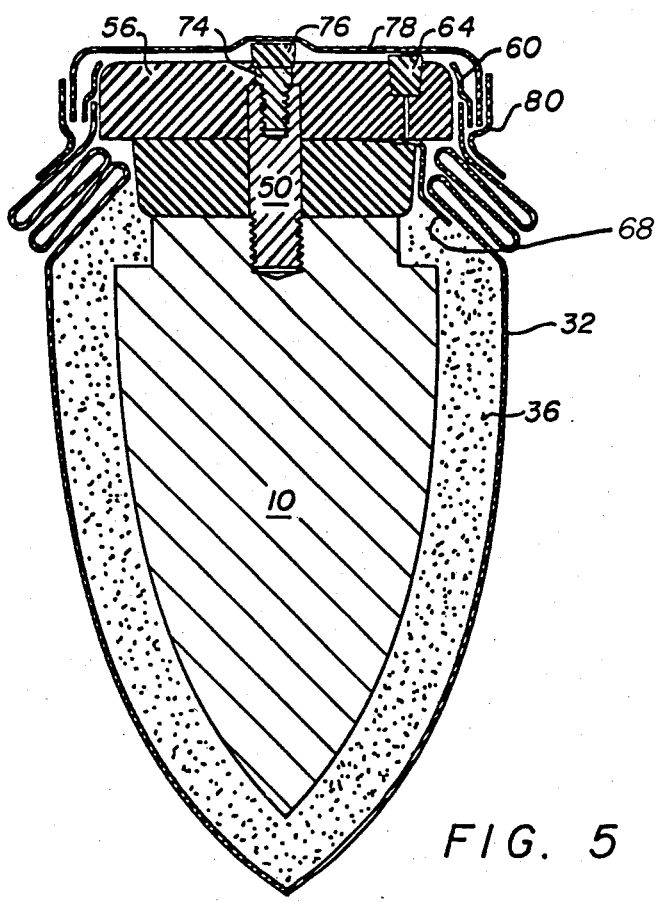
FIG. 5 is a cross-sectional view of a mandrel and composite material layer in position within an elastic bag for compacting by an isostatic pressing technique.

It has been found that by evacuating air from within the bag 32 and powder 36, fissures are prevented during the pressure release stage of isostatic pressing step 20. In order to permit evacuation of bag 32, a fabric strip 68 is positioned between the two sections of plug 56 in the vacinity of port 66 before bag 32 is sealed to the plug. The fabric strip defines a gas flow path between the sections of the plug and functions as a filter which prevents the evacuation of powder. A large bore hypodermic needle 70 is then pierced through stopper 64 into port 66. The air is drawn out of bag 32 and powder 36 by attaching needle 70 to a vacuum pump (not shown) through tubing 72. This evaluation step will typically consist of pumping down the sealed and powder filled bag for at least one hour. After the air has been withdrawn, the needle 70 is removed and, since stopper 64 is self-sealing, the interior of bag 32 will remain air free. Next, as shown in FIG. 5, rod 48 is disengaged from rod 50 and is replaced by machine screw 74 and stopper 76. This ensures proper sealing. A second elastomeric bag 78 is then placed over plug 56 and taped to bag 32 by tape 80.

Once the air has been evacuated from bag 32 and powder 36 and the bag 78 sealed to plug 56 and bag 32, isostatic pressing step 20 is commenced. This involves removing the mandrel 10 with bag 32 and composite powder layer 36 from mold 28 as a unit and placing this unitary assembly in a cold isostatic press which consists of a high pressure vessel (not shown) filled with water or other suitable liquid that will not degrade bags 32 and 78. The pressure of the liquid is raised slowly to the maximum desired value, preferably 30,000 psi, over a time span of about an hour. The maximum pressure is held for about 5 minutes. The pressure is then slowly reduced at a constant rate to 14.7 psi over a time span of 45 to 60 minutes. The controlled release of pressure is typically achieved by a high pressure needle value. Caution must be taken not to release the pressure too rapidly. If the pressure is released too rapidly, the compacted powder layer may fracture. While the above are the preferred pressures and times for the isostatic pressing of a PTFE composite layer, the maximum pressure may range from 5000 psi to 100,000 psi and be reached within 30 to 60 minutes. The maximum pressure should be held between 1 to 10 minutes. Furthermore, it is also possible to reduce the pressure from the maximum to atmospheric pressure within 5 to 60 minutes. As noted above, mandrel 10 is provided with undercut 14. This insures that layer 12 of compacted PTFE composite is locked and retained upon mandrel 10 after the completion of pressing step 20.

Figure 6:
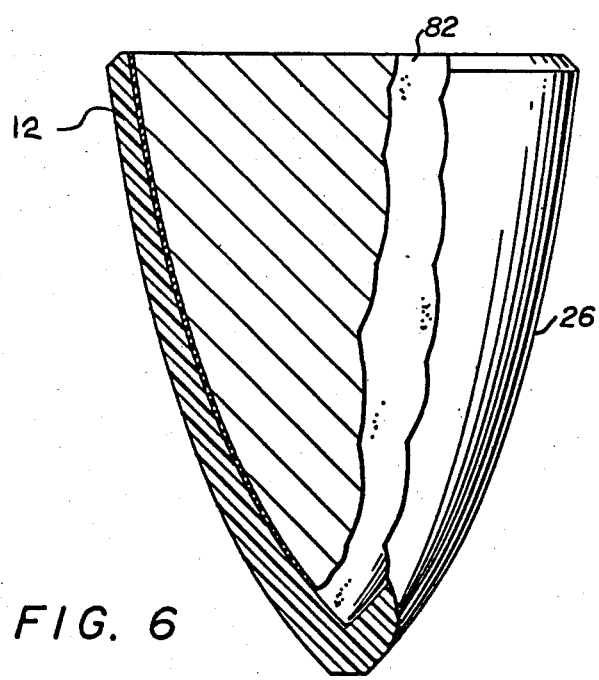
FIG. 6 is a side elevational view, partially in section, of a finished radome with a supporting liner bonded therein.

After completion of isostatic pressing step 20 the powder has been compacted into a layer 12 (FIGS. 1 and 6) which is very nearly at the ultimate desired density and which has a major percentage of fibers oriented as desired. The fibers in layer 12, before the isostatic pressing step 20, are randomly oriented substantially equally in all directions. The pressure applied during step 20 is in a direction normal to the surface of mandrel 10. This causes a large percentage of the fibers within the powder being compacted to become randomly oriented in planes which are perpendicular to lines which are normal to the nearest surface of mandrel 10. This may be contrasted to the technique of U.S. Pat. No. 4,364,884 wherein the principal fiber orientation is in planes which are perpendicular to the radome axis.

After completion of pressing step 20, the mandrel 10 and compressed layer 12 are subjected to a sintering step 22. This involves removing the mandrel 10 and layer 12 from the elastomeric bag 32 and subjecting layer 12 to a temperature ranging between 350° C. to 400° C., with the preferred temperature being 380° C. This heating is carried out by placing the mandrel 10 with layer 12 in a forced circulation oven which is provided with an inert atmosphere, preferably nitrogen. The sintering temperature is reached within 3 to 30 hours and held between 1 to 8 hours. The mandrel and layer 12 are then cooled to room temperature. Caution must be taken during cooling and heating the mandrel 10 and layer 12 to insure that a significant temperature differential is not established across the layer 12. This is especially critical as the temperature passes through the crystalline melting temperature of the PTFE and also as the temperature is lowered through the recrystallization temperature of the PTFE. If the temperature difference between the mandrel 10 and the exterior surface of the PTFE composite layer becomes too great the radome may crack. While sintering with layer 12 still positioned upon mandrel 10 is the preferred procedure, it is also possible to remove layer 12 from mandrel 10 prior to sintering step 22. This is accomplished by either machining the layer 12 to remove the locking tabs which engage undercut 14 or employing a mandrel which does not have the undercut. The sintering temperature and times remain the same for both methods.

With sintering step 22 completed, layer 12 is finished by machining it to the desired dimensions of the radome. If layer 12 remains upon mandrel 10 during sintering step 22, the mandrel 10 may be used as a support fixture for the concentric finishing of the outside contour of layer 12. The completed radome is obtained by removing layer 12 from mandrel 10. This is accomplished, as noted above, by a machining operation to separate the material around undercut 14.

It has been found that an added advantage of retaining layer 12 upon mandrel 10 during sintering step 22 is that the final percentage of fibers having the desired orientation is improved. This is a result of layer 12 being locked to undercut 14. Normally, layer 12 would creep up as it shrinks during the heating. By being locked to undercut 14, layer 12 must stretch as it shrinks in order to accommodate mandrel 10. This causes further compression of layer 12 in a direction normal to the axis of mandrel 10.

It should be apparent from the above discussion that the preferred technique of retaining layer 12 upon mandrel 10 during the sintering step 22 reduces the machining requirements and improves the final radome product.

Figure 3:
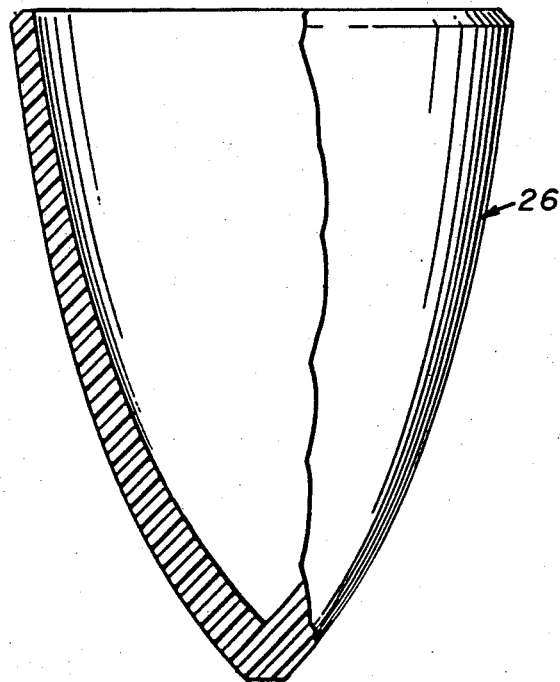
FIG. 3 shows a side elevational view, partially in section, of a finished radome in accordance with the invention.

With reference now to FIG. 3, a finished radome is indicated generally at 26. It should be apparent that radome 26, which is comprised of a compacted and sintered layer 12 of PTFE composite, may be produced in any desired shape by using an appropriately designed mandrel 10.

By providing the surfaces of a radome with grooves, exterior or interior or both, microwave reflection may be reduced. This reduction of reflection broadens the useable frequency range for the particular radome. It is believed that this reduction in reflection is a result of a gradual transition from the dielectric constant of the air to the dielectric constant of the radome material which results from the uniformly uneven surface contour.

Figure 7:
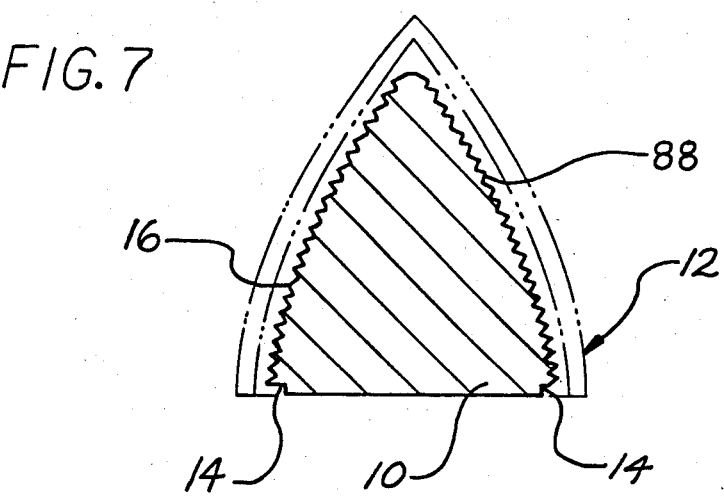
FIG. 7 is a cross-sectional view of a mandrel with a helically shaped surface groove.
Figure 8:
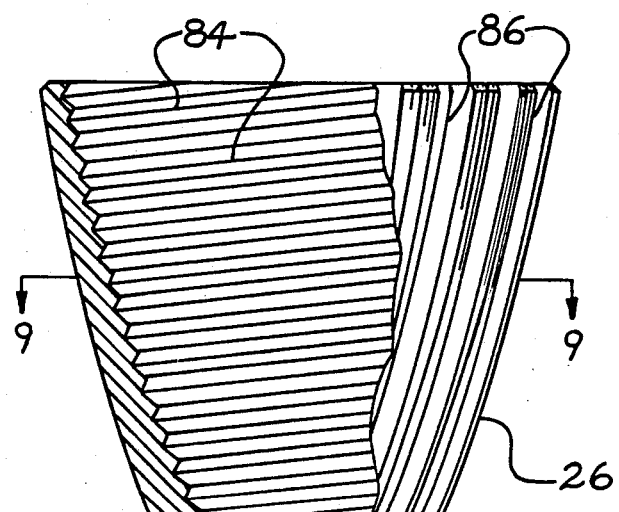
FIG. 8 is a side elevational view, partially in section, of a finished radome having grooves provided in both its exterior and interior surfaces.
Figure 9:
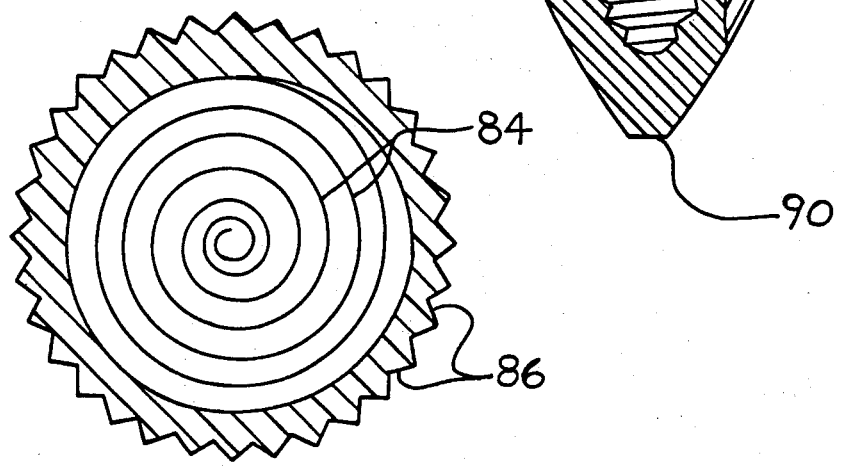
FIG. 9 is a cross-sectional view of the radome shown in FIG. 8 take along line 9—9.

Referring jointly to FIGS. 8 and 9, a radome 26 is shown with internal grooves 84 and external grooves 86. The internal grooves 84 are formed by molding the blended powder of PTFE and fibers around a mandrel 10 (FIG. 7) which is provided with a circumferentially oriented groove 88 in the form of a spiral or helix. In this manner the radome 26 can be removed from the mandrel 10 after it is sintered by twisting. The result is a radome 26 which has an inwardly spiraling groove 84, as seen best in FIG. 9, on its inner surface.

The exterior surface of radome 26 is provided with longitudinal grooves 86 during the final machining step 24. Preferably, the grooves 86 are longitudinal and radiate outwardly from the tip 90 of radome 26, but any configuration is possible.

Figure 10:
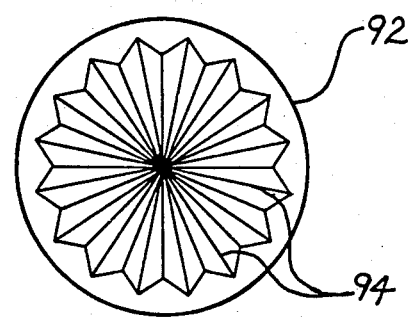
FIG. 10 is an end view of another mandrel for use in the practice of the present invention.
Figure 11:
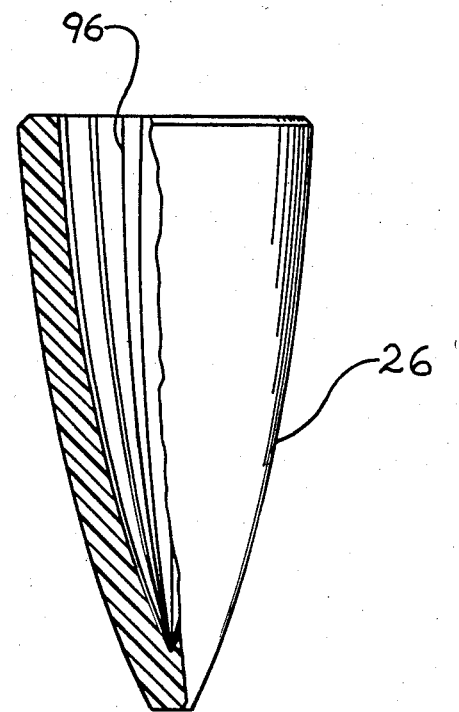
FIG. 11 is a side elevation view, partly in section, of a finished radome produced using the mandrel of FIG. 10.

Referring now to FIGS. 10 and 11, another embodiment of the present invention will be discussed. FIG. 10 shows a mandrel 92 which is provided with longitudinal grooves 94 which forms longitudinal grooves 96 in the interior surface of radome 26 of FIG. 11.

It is to be noted that when the mandrel is provided with an irregular surface contour, for the purpose of forming grooves in the interior surface of the radome, the fiber orientation will be tangent to the average of the nearest mandrel surface. Thus, in the vicinity of the grooves 96 there will be regions wherein the majority of the fibers will not lie in planes which are perpendicular to lines normal to the mandrel surface.

It is further to be noted that, in discussing fiber orientation herein, applicant is referring to mutually orthogonal X, Y and Z axes within the PTFE composite material, with the Z axis being normal to the interior surface of the radome. Employing this convention, the least number of fibers are oriented in the Z direction because of the direction of the applied pressure during the compacting step.

While preferred embodiments have been described and illustrated, modifications and substitutions may be made thereto without departing from the spirit and scope of the invention. Accordingly, the present invention has been described by way of illustration and not limitation.

What is claimed is:

1. A unitary structure, said structure having an axis and comprising:

a tip portion, said tip portion being symmetrical with respect to the axis of the unitary structure and being continuous;

a tubular portion extending from and integral with said tip portion, said tubular portion being coaxial with said tip portion and terminating at an annular surface having an exterior diameter greater than the maximum diameter of said tip portion;

said tip and tubular portions having internal and external surfaces and being comprised of a fiber filled polymeric composite, the majority of the fibers comprising said composite being oriented in planes which are perpendicular to lines normal to the average contour of the interior surface of the unitary structure; and grooves being formed on at least one of the internal or external surfaces of said tip and tubular portions, sai grooves reducing microwave reflection.

2. The article of claim 1 wherein the fibers comprise from 5 to 40 parts by weight of the composite.

3. The article of claim 1 wherein:
said polymeric composite comprises a fluoropolymeric composite.

4. The article of claim 1 wherein:
said unitary structure comprises a radome.

5. The article of claim 4 including:
a supporting liner within said radome.

6. The article of claim 1 including:
said grooves are formed in a spiral or helix on the interior surface of said tip and tubular portions.

7. The article of claim 1 including:
a plurality of longitudinally extending grooves on the interior surface of said tip and tubular portions.

8. The article of claim 1 including:
a plurality of longitudinally extending grooves on the exterior surface of said tip and tubular portions.

* * * * *